(12) United States Patent
Meijer et al.

(10) Patent No.: US 8,032,859 B2
(45) Date of Patent: Oct. 4, 2011

(54) TYPE EXTENSIONS

(75) Inventors: Henricus Johannes Maria Meijer, Mercer Island, WA (US); Paul A. Vick, Seattle, WA (US); Brian C. Beckman, Newcastle, WA (US); Amanda Silver, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1411 days.

(21) Appl. No.: 11/214,424

(22) Filed: Aug. 29, 2005

(65) Prior Publication Data

US 2007/0050168 A1 Mar. 1, 2007

(51) Int. Cl.
*G06F 9/44* (2006.01)
*G06F 9/45* (2006.01)

(52) U.S. Cl. ........ 717/106; 717/108; 717/110; 717/118; 717/116; 717/140

(58) Field of Classification Search .................. 717/106, 717/108, 110–113, 118, 116, 140, 136
See application file for complete search history.

(56) References Cited

U.S. PATENT DOCUMENTS

| | | | |
|---|---|---|---|
| 5,987,247 A * | 11/1999 | Lau ................................ | 717/108 |
| 6,149,318 A * | 11/2000 | Chase et al. .................. | 717/131 |
| 6,230,318 B1 * | 5/2001 | Halstead et al. ............. | 717/108 |
| 6,240,545 B1 * | 5/2001 | Carmichael et al. .......... | 717/128 |
| 6,263,498 B1 * | 7/2001 | Alcorn et al. ................. | 717/110 |
| 6,298,475 B1 * | 10/2001 | Alcorn ........................... | 717/118 |
| 6,631,513 B1 * | 10/2003 | Gil et al. ....................... | 717/116 |
| 6,754,887 B1 * | 6/2004 | Gil et al. ....................... | 717/116 |
| 6,976,243 B2 * | 12/2005 | Charisius et al. ............. | 717/108 |
| 7,017,145 B2 * | 3/2006 | Taylor .......................... | 717/104 |
| 7,340,720 B2 * | 3/2008 | Halstead et al. ............. | 717/108 |
| 7,373,639 B2 * | 5/2008 | Halstead et al. ............. | 717/140 |
| 7,500,229 B2 * | 3/2009 | Tanaka et al. ................ | 717/136 |
| 2002/0010909 A1 * | 1/2002 | Charisius et al. ............... | 717/2 |
| 2003/0058277 A1 * | 3/2003 | Bowman-Amuah .......... | 345/765 |

OTHER PUBLICATIONS

Gil, et al. "Environmental Acquisition—A New Inheritanc-Like Abstraction Mechanism", 1996, ACM, p. 214-231.*

* cited by examiner

*Primary Examiner* — Wei Zhen
*Assistant Examiner* — Qamrun Nahar
(74) *Attorney, Agent, or Firm* — Workman Nydegger

(57) ABSTRACT

A system for extending data types in software comprises an extension unit that modifies an arbitrary preexisting base data type, the preexisting base data type having at least one member. The system also includes a supplemental member that is included with the extension unit and that provides additional functionality to the preexisting base type. Methods for using the system are also provided.

20 Claims, 11 Drawing Sheets

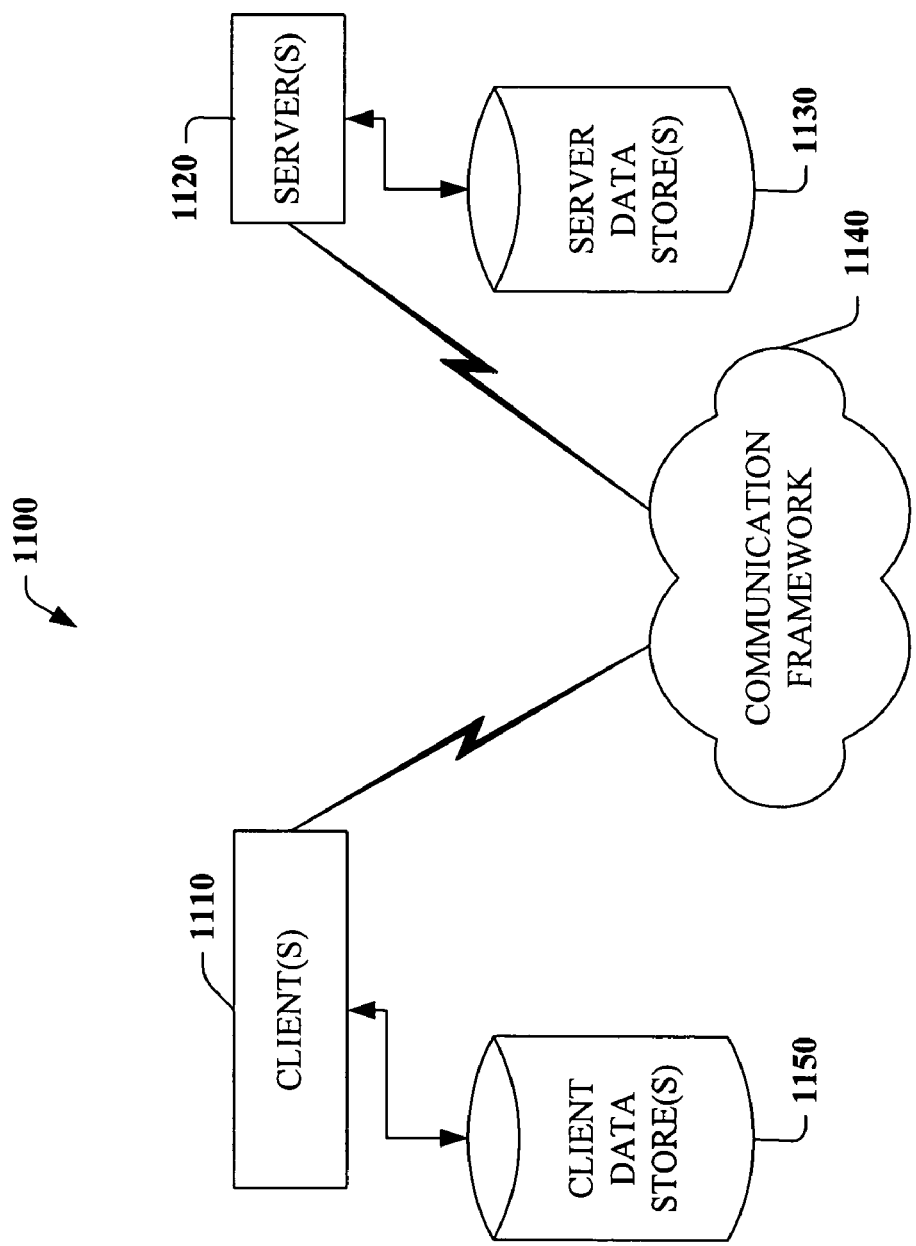

TYPE EXTENSIONS

BACKGROUND

Field of the Invention

The invention as claimed generally relates to the fields of computing, computer software and computer software programming.

Many modern programming languages support the concept of types. A type usually is statically assigned to some programming construct when source code that implements a programming construct is translated by a compiler into an executable computer program, that is, at compile time. Alternatively, a type often can be assigned dynamically to some programming construct during execution of the compiled computer program, that is, at run time. Some high-level programming languages, along with compilers that support those languages, can support both static and dynamic type assignments.

Generally, a type has a specific definition that describes the type and attributes of that type, for example, included data structures and supported methods, among others. When a compiler assigns a type to a programming construct, it usually checks to ensure that the programming construct to which the compiler is assigning the type is consistent with the definition for that type. Failures of programming constructs to adhere to established definitions of types can often result in compile time errors or run time errors. Strict adherence to type definitions is often required, especially when writing software using a high-level programming language that is considered to be a strongly-typed language.

One common drawback of requiring such adherence to type definitions is a lack of flexibility for programmers or software developers to draw upon when creating software. A common approach that developed in response is the concept of extensions. An extension for a type provides a modified type that a programmer can use in place of a previously-provided type. Extensions are commonly used to provide additional methods or data members in object-oriented programming languages. In some high-level programming languages a programmer or a software developer can use preestablished type extensions or can create custom extensions themselves.

Although a powerful tool, current extensions still have significant limitations. For example, various types, for a variety of reasons that can be wholly dependent upon the high-level programming language involved or upon a particular implementation of that language, cannot be extended. Other types can be extended only in limited ways. Current systems fail to provide abilities to extend types in ways that are desired by computer programmers or software developers.

SUMMARY

The following presents a simplified summary in order to provide a basic understanding and high-level survey. This summary is not an extensive overview. It is neither intended to identify key or critical elements nor to delineate scope. The sole purpose of this summary is to present some concepts in a simplified form as a prelude to the more detailed description later presented. Additionally, section headings used herein are provided merely for convenience and should not be taken as limiting in any way.

A type extension can extend an arbitrary data type to provide supplemental functionality or additional members. The type extension can extend an arbitrary data type and can extend data types that ordinarily cannot be extended, such as an interface or an array. The arbitrary type that is being extended can be a pre-existing part of a high level programming language or can be a constructed type. Members of the type extension can be shared between or among types and can be used across compilation units. The type extension can be made a part of a high level programming language and can be accessed by using keywords in accordance with a predefined syntax.

A type extension system can translate a type extension of an arbitrary type that is implemented in a high level programming language into machine-executable code that can be used as part of an application program. The type extension can provide additional members that supplement features or functions of a base type. The type extension system can handle code compilation, code optimization, syntax checking, and other typical code creation tasks. Additionally, the type extension system can enforce security constraints either along or in conjunction with a runtime environment. Various restrictions on type extensions can be applied or lifted as desired to implement various code creation policies.

The disclosed and described components and methods comprise one or more of the features hereinafter described and particularly pointed out in the claims. The following description and the annexed drawings set forth in detail certain specific illustrative components and methods. However, these components and methods are indicative of but a few of the various ways in which the disclosed components and methods can be employed. Specific implementations of the disclosed and described components and methods can include some, many, or all of such components and methods, as well as their equivalents. Variations of the specific implementations and examples presented herein will become apparent from the following detailed description when considered in conjunction with the drawings.

BRIEF DESCRIPTION OF THE DRAWINGS

FIG. 11 illustrates an exemplary networking environment.

DETAILED DESCRIPTION

Figure 1:
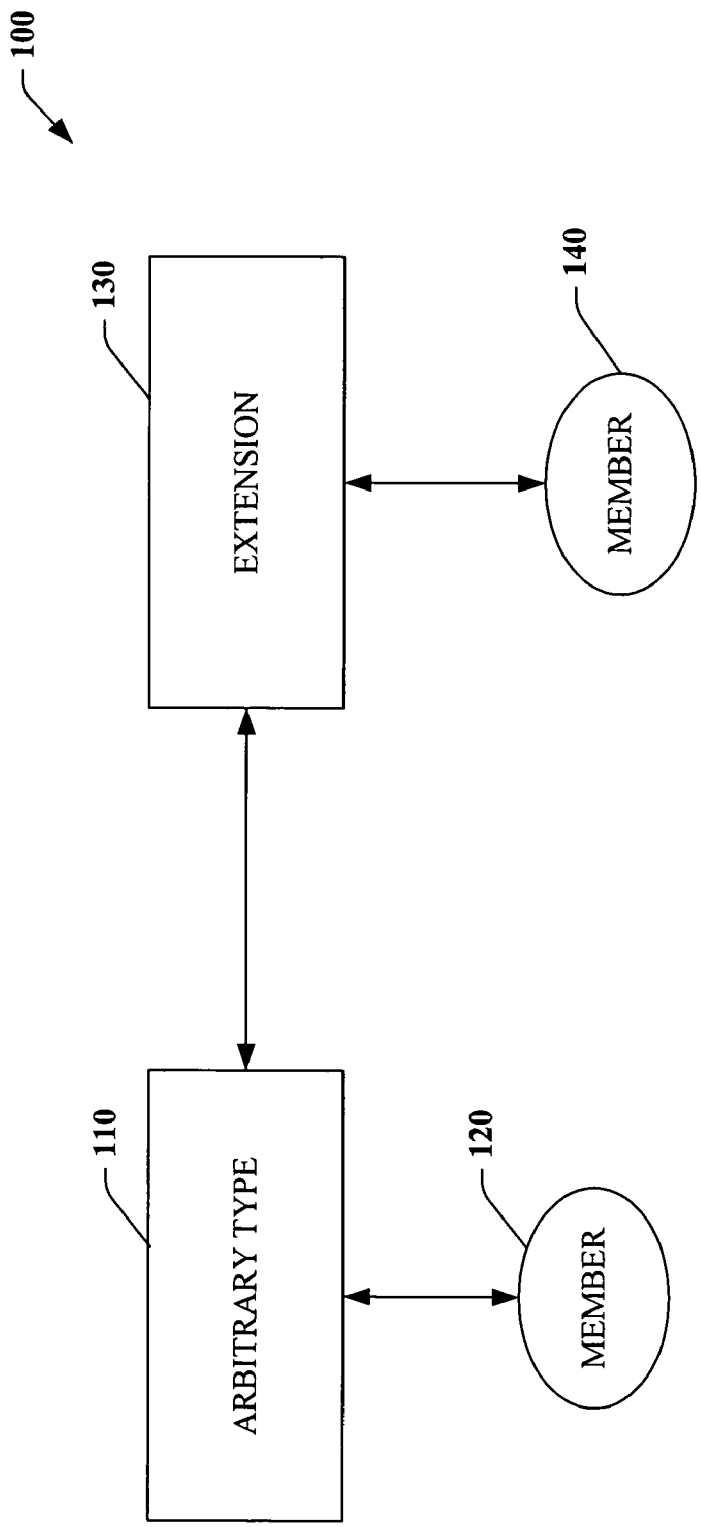
FIG. 1 is a system block diagram of a type extension system.

As used in this application, the terms "component," "system," "module," and the like are intended to refer to a computer-related entity, such as hardware, software (for instance, in execution), and/or firmware. For example, a component can be a process running on a processor, a processor, an object, an executable, a program, and/or a computer. Also, both an application running on a server and the server can be components. One or more components can reside within a process and a component can be localized on one computer and/or distributed between two or more computers.

Disclosed components and methods are described with reference to the drawings, wherein like reference numerals are used to refer to like elements throughout. In the following description, for purposes of explanation, numerous specific details are set forth in order to provide a thorough understanding of the disclosed subject matter. It may be evident, however, that certain of these specific details can be omitted or combined with others in a specific implementation. In other instances, certain structures and devices are shown in block diagram form in order to facilitate description. Additionally, although specific examples set forth may use terminology that is consistent with client/server architectures or may even be examples of client/server implementations, skilled artisans will appreciate that the roles of client and server may be reversed, that the disclosed and described components and methods are not limited to client/server architectures and may be readily adapted for use in other architectures, specifically including peer-to-peer (P2P) architectures, without departing from the spirit or scope of the disclosed and described components and methods. Further, it should be noted that although specific examples presented herein include or reference specific components, an implementation of the components and methods disclosed and described herein is not necessarily limited to those specific components and can be employed in other contexts as well.

It should also be appreciated that although specific examples presented may describe or depict systems or methods that are based upon components of personal computers, the use of components and methods disclosed and described herein is not limited to that domain. For example, the disclosed and described components and methods can be used in a distributed or network computing environment. Additionally or alternatively, the disclosed and described components and methods can be used on a single server accessed by multiple clients. Those of ordinary skill in the art will readily recognize that the disclosed and described components and methods can be used to create other components and execute other methods on a wide variety of computing devices.

FIG. 1 is a system block diagram of a type extension system 100. The type extension system 100 can be used to extend an arbitrary data type to provide additional members or functionality for that data type. Specifically, the type extension system 100 can be used to extend types across compilation unit boundaries, among other things.

The type extension system 100 includes an arbitrary type 110. The arbitrary type 110 can be a type that is defined as a core portion of a high-level programming language, such as an object-oriented programming language, among others. The arbitrary type 110 includes at least one member 120. The member 120 can be a method, a static data member, a field, a property, a constructor, an accessor, or any other appropriate member. Specifics of the member 120 can be highly dependent upon a specific implementation.

Those of ordinary skill in the art will recognize from reading this disclosure that various details, such as the specifics of the member 120, will be highly dependent upon a specific programming language as well as a compiler for that programming language, among other things. Also, specifics of a runtime environment for executable programs that are created in a particular high level programming language can also affect not only specifics of the member 120 but also other attributes or features of the components, systems, and methods disclosed or described herein. Depending upon specific choices of an artisan who is implementing the disclosed and described components, systems, and methods, one or more features or attributes of components used for implementation can be, or in some cases must be, modified. Additionally, it should be noted that with reference to this specific example, as well as other examples presented herein, reference may be made to an object-oriented programming language as well as exemplary code segments in the style of an object-oriented programming language. Such examples and segments are not intended to imply, and do not imply, that use of a high-level object-oriented programming language or particular code segments, including particular syntax constructions, are necessary to implement the components, systems, and methods disclosed and described herein.

An extension 130 is coupled to the arbitrary type 110. A member 140 is associated with the extension 130. When so coupled, features of the extension 130 and its member 140 can supplement features of the arbitrary type 110 and its member 120. In this basic manner, arbitrary types, such as the arbitrary type 110, can be extended, such as by coupling an extension like the extension 130, to the arbitrary types to supplement their features, attributes, and abilities.

A high level programming language used to implement the components disclosed and described with reference to this FIG. 1 can have a predefined syntax. Additionally, the high level programming language can have a number of reserved or key words that can be interpreted by a compiler for that high level programming language to have particular meanings. In such a high level programming language, a type extension can, for example, be declared in a using a keyword Extension, followed by a keyword For, to declare which preexisting type the newly-declared type extends. This initial declaration can be supplemented by declarations of members of the newly-declared type. All members declared in the type extension can be considered to be members of the type being extended. Additionally or alternatively, the type extension can be in the same assembly as the preexisting type being extended. It is also possible to introduce extension members by attaching additional metadata, such as metadata in the form of custom attributes or annotations, to ordinary members.

Following is a sample code segment to further illustrate these concepts. Within this exemplary code segment, the following scenario is presented. Within the context of the type extension, the type of Me in instance members is the preexisting type being extended. In this example, the newly-declared extension StringExtension supplements the preexisting String type by adding a new method Print( ) to the String type.

```
Extension StringExtensions For String
    Public Sub Print( )
        Console.WriteLine(Me)
    End Sub
```

End Extension

Given the extension, and the supplemental functionality it provides, users can now write s.Print( ) to access the newly-declared Print( ) method, given a target expression s of static type String. The following code segment depicts a sample method call in this manner.

```
Module Test
    Sub Main( )
        Dim s As String = "Hello, World!"
        s.Print( )
    End Sub
End Module
```

When compiled, the compiler can translate the expression s.Print( ) to actually call the method defined in the correct extension.

Type extensions can be restricted in a variety of ways. Such restrictions can be for reasons such as code security, execution security, and type system requirements, among others. Most, if not all, of these restrictions can be lifted, according to various implementation desires and choices. For example, an extension, such as the extension 130, can be restricted such that it can only access members of the original type that the extension 130 extends that are accessible to the extending compilation unit. This restriction can be lifted by using reflection. The extension 130 can be restricted such that it cannot declare new instance variables or non-Custom instance events. This restriction can be lifted by using a look-aside table.

Additionally or alternatively, the extension 130 can be restricted so that it cannot declare an Overridable or an Overrides method. This restriction can be lifted but can also require runtime support if so lifted. The extension 130 can be restricted such that it cannot declare a shared constructor. This is merely a design restriction can be lifted as desired in another implementation.

An extension such as the extension 130 cannot declare nested types. The extension 130 also cannot implement new interfaces. The restriction on implementing new interfaces can be lifted with support of a runtime environment that can allow an interface implementation to be registered at runtime using one or more dynamic vtables. Such support can allow partial types to implement new interfaces across one or more assemblies.

A New call at the beginning of an instance constructor can be restricted to only call constructors that are declared as Public. This restriction can be lifted by using reflection. Also, the extension 130 can be restricted such that methods of the extension 130 cannot declare Static local members. This restriction can be lifted by using a look-aside table or by direct run-time support.

The following sample code segment provides an example of extending a class Delegate.

```
Extension DelegateExtensions For Delegate
    Public Shared Operator +(ByVal d1 As\
            Delegate, ByVal d2 As Delegate)\
            As Delegate
        Return System.Delegate.Combine (d1, d2)
    End Operator
    Public Function CompareTo(ByVal d2 As\
            Delegate) As Integer
        Return IIf(Me = d2, 0, −1)
    End Function
    Public Function Equals(ByVal d2 As Delegate)\
            As Boolean
        Return Me = d2
    End Function
End Extension
```

Extensions to a type are only available when the type extension is in scope and accessible. If this is not the case, the original type will not appear to have been extended. Referring to an original type when only an extension of the type is available can produce a compile-time error. It is important to note that the For clause can accept any type expression. This feature results in the fact that types such as arrays can be extended.

An example code segment further describes this feature.

```
Extension IntegerArrayExtensions For Integer( )
    Public Sub Sum( )
        Dim Total As Integer = 0
        For Each i As Integer In Me
            Total += i
        Next i
        Return Total
    End Sub
End Extension
```

Types such as an Interface type can also be extended. In this case, it should be noted that depending upon implementation, a type extension of an interface can supply the implementation of that interface for all new members. Types that implement an extended interface can be restricted such that those types only implement members originally declared by the interface being extended. The following code segment further illustrates this concept:

```
Interface IFoo
    Sub Bar( )
End Interface
Extension IFooExtensions For IFoo
    Public Sub Baz( )
        Bar( )
    End Sub
End Extension
Class C
    Implements IFoo
    Sub Bar( ) Implements IFoo.Bar
        ...
    End Sub
```

At this point, a compiler error such as the following can be generated:
    'ERROR: Cannot implement extension method IFoo.Baz
    Sub Baz( ) Implements IFoo.Baz
The code segment can be completed as follows:

```
        ...
    End Sub
End Class
```

A type extension such as the type extension 130 can also have one or more type parameters which allow it to extend generic types. The following code segment further illustrates this concept.

```
Extension IEnumerableExtensions(Of T) For
        IEnumerable(Of T)
    Public Function Filter(ByVal FilterDelegate
    As Func(Of T, T)) _
            As IEnumerable(Of T)
        ...
    End Function
End Extension
```

-continued

```
Extension StringDictionaryExtensions(Of T) For
Dictionary(Of String, T)
        Public Function SortedKeys( ) As String( )
            ...
        End Function
End Extension
```

Type extensions can also have more restrictive type constraints on their type parameters. The following code segment further illustrates this principle.

```
Extension IEnumerableComparableExtensions(Of T
    As IComparable(Of T)) _
        For IEnumerable(Of T)
        Public Function Sort( ) As IEnumerable(Of T)
            ...
        End Function
End Extension
```

Figure 2:
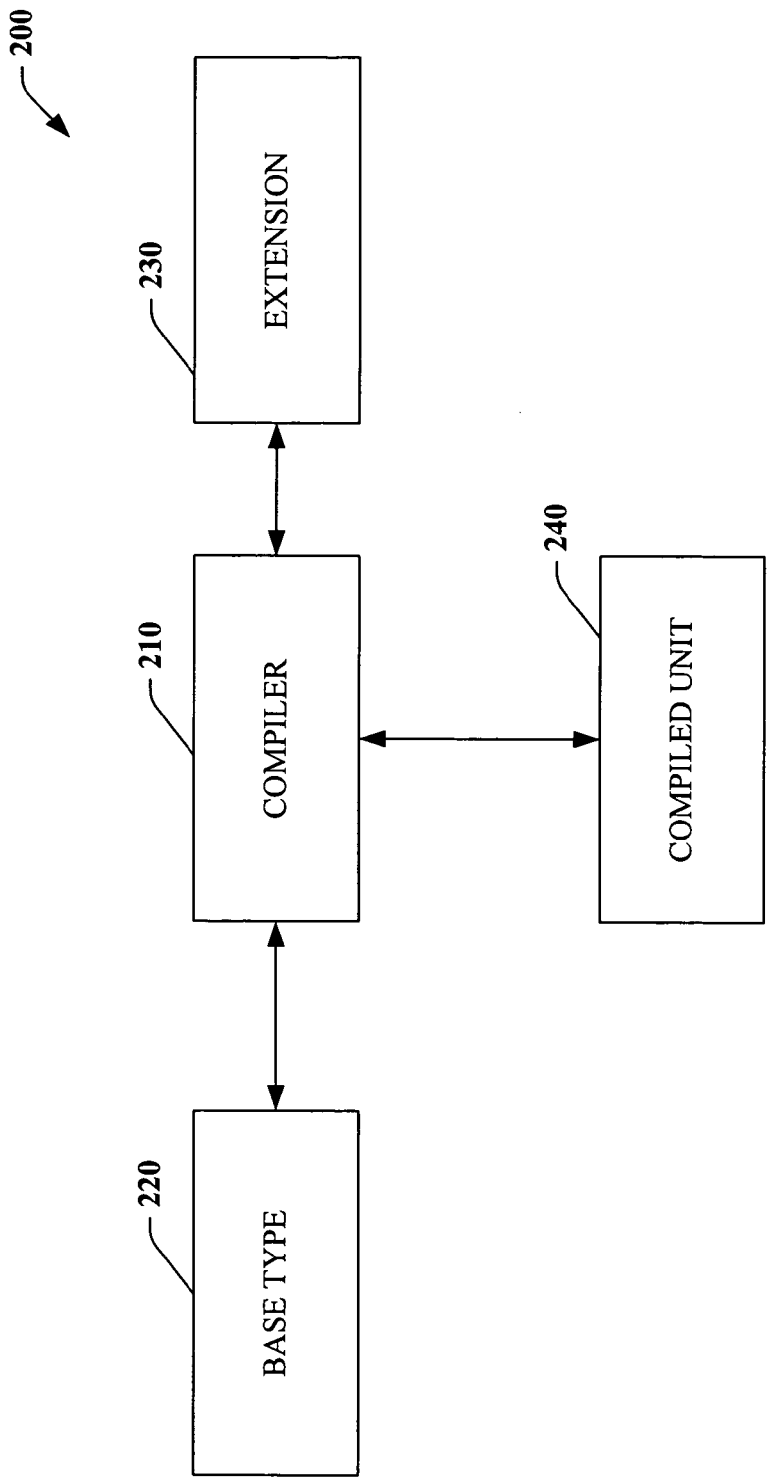
FIG. 2 is a system block diagram of a type extension compilation system.

FIG. 2 is a system block diagram of a type extension compilation system 200. The type extension compilation system 200 can be used to create an executable computer application from source code written in a high level programming language. Specifically, the type extension compilation system 200 can be used to create an executable computer application from source code that includes type extensions of arbitrary types, such as the type extensions previously disclosed and described in conjunction with FIG. 1.

The type extension compilation system 200 includes a compiler 210. The compiler 210 can provide translation and optimization tasks to create machine-executable code from human-readable source code in a machine-readable format. Additionally, the compiler can statically assign types to declared programming constructs such as classes or other data structures, among others.

The compiler 210 can access a base type 220. The base type 220 can be a type that is supported as a core part of a high-level programming language, for example, type Object. Alternatively, the base type 220 can be a constructed type. The constructed type can be completely defined by a computer programmer or software developer. Many high level programming languages, along with their associated compilers, can provide support for constructed types. Any of these languages and compilers can be used as a base system to implement the type extension compilation system 200.

An extension 230 can also be accessed by the compiler 210. The compiler 210 can use information about or attributes of the extension 230 to assign a type for an extended base type created from the base type 220. The compiler 210 ultimately translates human-readable source code to a compiled unit 240. The compiled unit 240 can be executed on a computer to perform some function that uses the extended base type.

Figure 3:
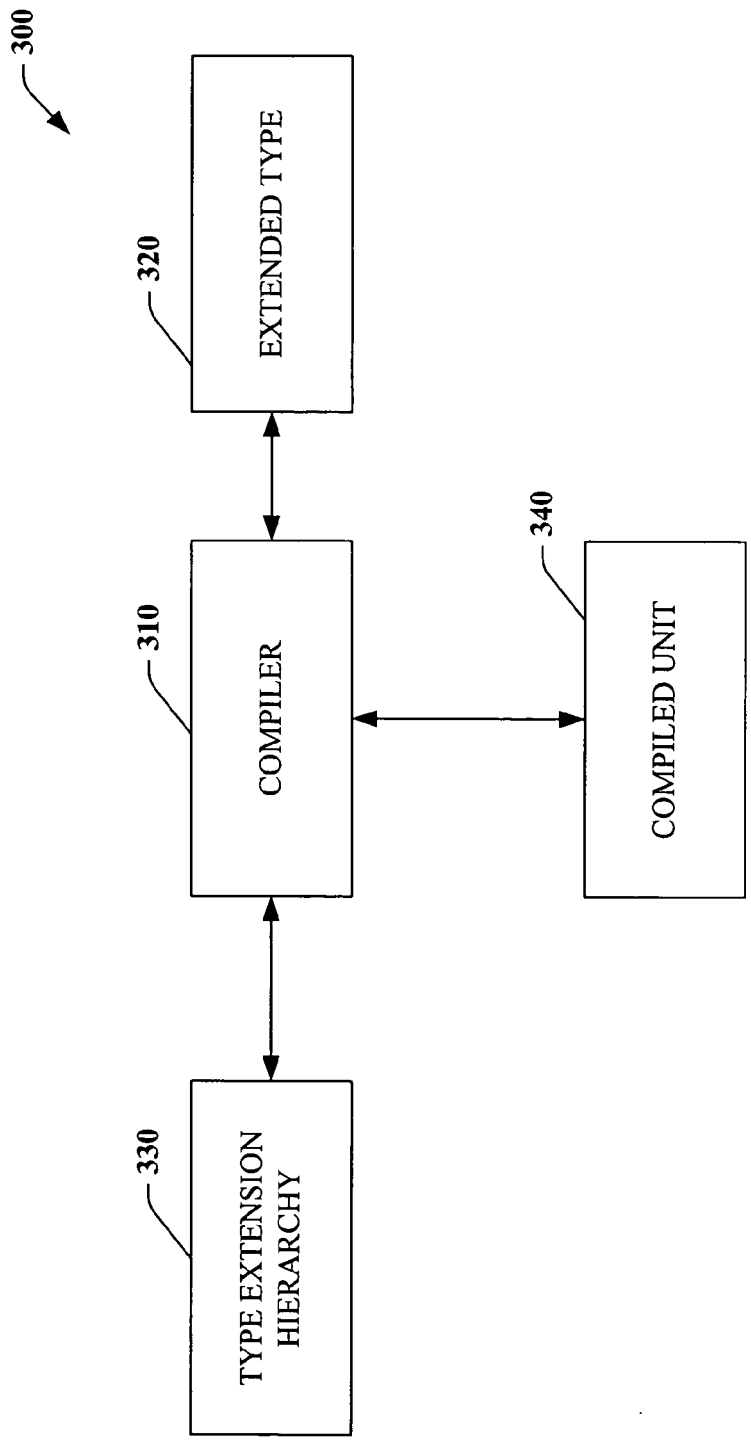
FIG. 3 is a system block diagram of a type extension compilation system.

FIG. 3 is a system block diagram of a type extension compilation system 300. The type extension compilation system 300 can be used to assign a type to a programming construct during compilation of human readable source code into an executable software application. Specifically, the type extension compilation system 300 can be used to assign types to programming constructs that extend arbitrary types in accordance with predefined or pre-established assignment rules or an assignment hierarchy.

The type extension compilation system 300 includes a compiler 310. The compiler 310 can provide standard compilation tasks such as translation and optimization tasks in addition to providing type extension support. The compiler 310 can access an extended type 320 and a type extension hierarchy 330. The extended type 320 can provide a target for the compiler to assign a type designator. The type extension hierarchy 330 can include a set of types to be assigned when the compiler attempts to assign a type to the extended type 320. The set of types of the type extension hierarchy 330 can be arranged such that types cascade in a predefined order according to a set of assignment rules. The compiler 340 ultimately outputs a compiled unit 340.

As with many programming languages and constructs, a syntax can be defined for use. An exemplary syntax for type extensions can be defined as follows.

```
ExtensionDeclaration  ::=
    [ Attributes ]  [ ExtensionModifier+ ]
    Extension  Identifier  [ TypeParameterList ]
        StatementTerminator
    [ ExtensionMemberDeclaration+ ]
    End  Extension  StatementTerminator
ExtensionModifier  ::=  TypeModifier
ExtensionMemberDeclaration  ::=
    CustomEventMemberDeclaration  |
    ConstantMemberDeclaration  |
    MethodMemberDeclaration  |
    PropertyMemberDeclaration  |
    ConstructorMemberDeclaration  |
    OperatorDeclaration
```

Figure 4:
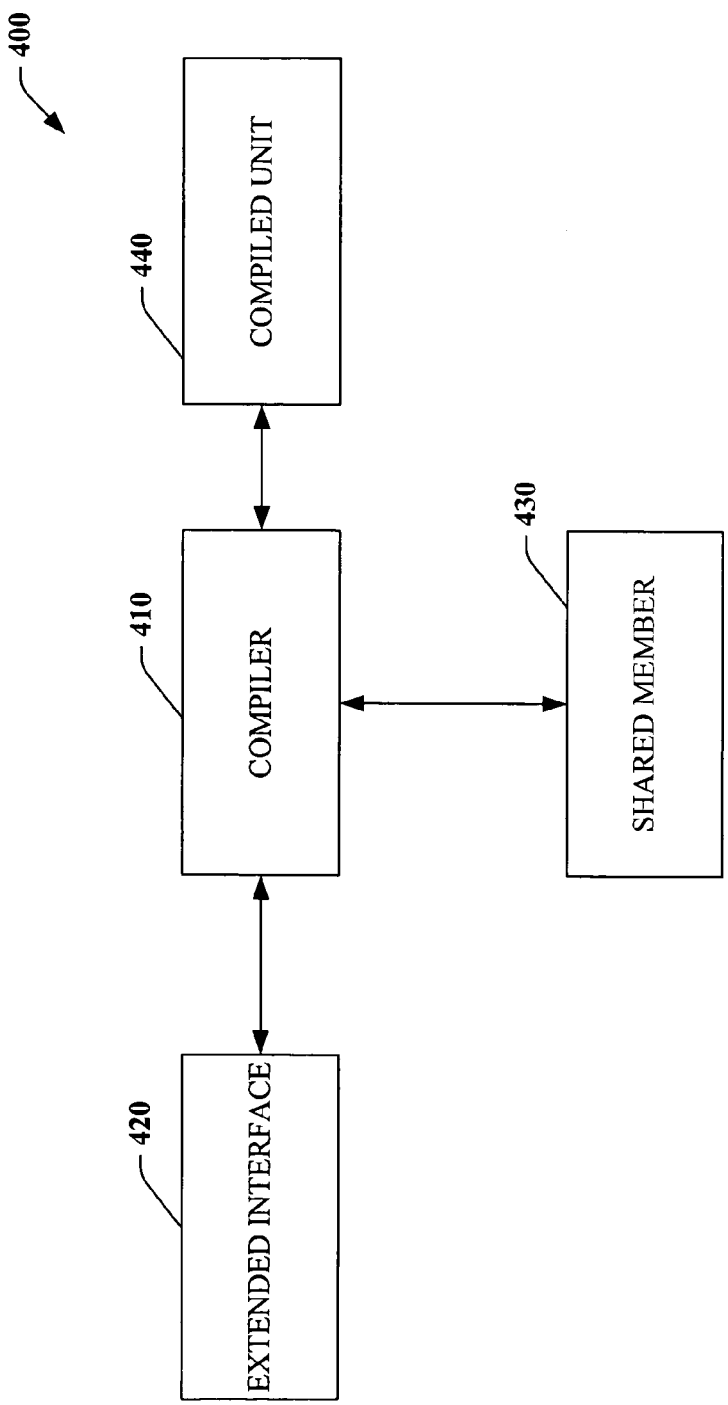
FIG. 4 is a system block diagram of a type extension compilation system.

FIG. 4 is a system block diagram of a type extension compilation system 400. The type extension compilation system 400 can be used to create executable software that includes type extensions for arbitrary types. Specifically, the type extension compilation system 400 can be used to extend an interface using a shared member.

The type extension compilation system 400 includes a compiler 410. As in preceding examples, the compiler 410 can provide standard compilation tasks such as translation and optimization tasks in addition to providing type extension support. An extended interface 420 can be accessed by the compiler 410 during its operation. Additionally, the compiler 410 can access a shared member 430. The compiler 410 can use information about the extended interface 410 and the shared member 430 to create a compiled unit 440. The compiled unit 440 can be executable computer code that can perform some function that uses or depends upon the extended interface 420 and the shared member 430.

The type extension compilation system 400 can be used to support interfaces that can be extended in a wide variety of ways. Specifically, an interface can include a shared method, a shared event, a shared constructor, an implicitly shared constant, a shared variable, shared properties, and operartors, among others. Type extensions for interfaces can also enable the addition of instance members to interfaces that have a fixed implementation. This addition is also possible in an interface through the declaration of NotOverridable members in the interface. A NotOverridable member in an interface is like an extension method in the sense that the NotOverridable member can access any of the other members in the interface, it cannot be implemented by an implementing type, and it cannot declare any Static local members.

The following exemplary code segment provides a further illustration of this concept.

```
Interface IMath
    Function Add(ByVal r As IMath) As IMath
```

```
        Function Negate( ) As IMath
        NotOverridable Function Subtract(ByVal r As
IMath) As IMath
            Return Add(Me.Negate( ), r)
        End Function
End Interface
```

Because shared members and instance members with fixed implementation in interfaces require access specifiers, they are now allowed on all members in an interface. The default access can be set as Public. Regular instance members of interfaces can be required to be declared as Public. For example, in the following code segment:

```
InterfaceMemberDeclaration  ::=
    NonModuleDeclaration  |
    InterfaceEventMemberDeclaration  |
    EventMemberDeclaration  |
    InterfaceMethodMemberDeclaration  |
    MethodMemberDeclaration  |
    InterfacePropertyMemberDeclaration  |
    PropertyMemberDeclaration  |
    VariableMemberDeclaration  |
    ConstantMemberDeclaration  |
    OperatorDeclaration
```

InterfaceProcedureModifier becomes a regular ProcedureModifier.

Figure 5:
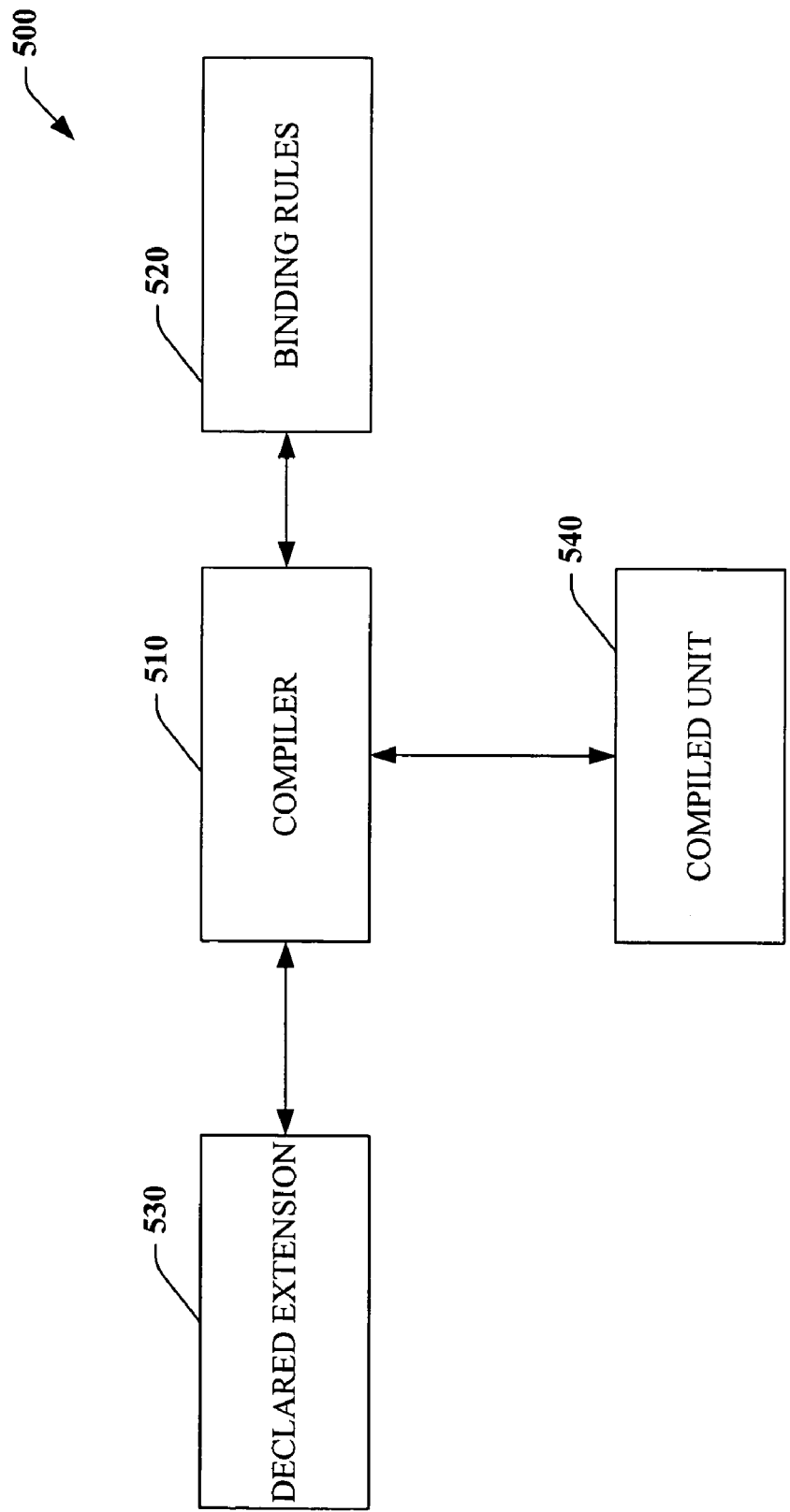
FIG. 5 is a system block diagram of a type extension compilation system.

FIG. 5 is a system block diagram of a type extension compilation system 500. The type extension compilation system 500 can be used to create executable software that includes type extensions for arbitrary types. Specifically, the type extension compilation system 500 can be used to manage bindings for extended types and to disambiguate potentially conflicting bindings.

The type extension compilation system 500 includes a compiler 510. As disclosed or described in previous examples, the compiler 510 can provide a variety of tasks, specifically including traditional compilation tasks such as syntax checking, binding, and code optimization, among others. To perform some of these tasks, the compiler 510 can access a set of binding rules 520. The binding rules 520 can specify order of bindings and a binding hierarchy, among other things. A compiled unit 540 is the output of the compiler 510.

Various methods and mechanisms can be used in the compiler 510 to create the compiled unit 540. Among those methods and mechanisms is a set relating to binding. Binding can occur in accordance with the binding rules 520. When binding against individual members of a specified type, members of the original type declaration can always be considered first. If the various binding operations against those members succeeds, no type extensions are considered. If this rule is applied, a type extension from another assembly cannot override the definition of a particular name in the original type declaration. If the binding against the members of the original type declaration fails, then the rules used for finding regular type names are used to search for extensions to the type.

The following exemplary code segment further illustrates these concepts.

```
Extension OuterBarExtensions For Bar
    Sub M( )
```

```
        End Sub
    End Extension
    Namespace Inner
        Extension InnerBarExtensions For Bar
            Sub M( )
            End Sub
        End Extension
        Module InnerTest
            Sub Test( )
                Dim b As New Bar ( )
                b.M( ) ' Calls InnerBarExtensions.M
            End Sub
        End Module
    End Namespace
    Module OuterTest
        Sub Test( )
            Dim b As New Bar( )
            b.M( ) ' Calls OuterBarExtensions.M
        End Sub
    End Module
```

A type extension TE that extends a type T', where type T' can be a constructed type, can be considered an extension to a type T, which also can be a constructed type, if the fully qualified name of T' is the same as the fully qualified name of T. Also, the number of type arguments to T' can be required to match the number of type arguments to T. The type arguments to T', when inferred from the type arguments of T, can also be required to satisfy any constraints on the type parameters of the type extension TE.

In a situation where two type extensions provide the same member to the same type, a call to a member may be disambiguated using the name of the type extension. If the member being disambiguated in this way is an instance member, then the first parameter of the member is of the type being extended and is supplied as the Me argument to the member.

The following code segment provides a further example to illustrate this concept.

```
Imports A
Imports B
Namespace A
    Extension AExtensions For Bar
        Sub M( )
        End Sub
    End Extension
Namespace B
    Extension BExtensions For Bar
        Sub M( )
        End Sub
    End Extension
End Namespace
Module OuterTest
    Sub Test( )
        Dim b As New Bar( )
        b.M( )       'Ambiguous between A.M and B.M
        AExtensions.M(b)    ' Calls A.M
        BExtensions.M(b)    ' Calls B.M
    End Sub
End Module
```

The compiler 510 can also be modified for more sophisticated or predictive behavior. For example, the compiler 510 can include or access an artificial intelligence component that can assist in guiding such operations as binding or code optimization, among others. A variety of different types of artificial intelligence-based components can be used in conjunction with the compiler 510, as well as other compilers that have been disclosed or described in conjunction with other figures. Additionally, the use of an artificial intelligence-based component is not limited to a compiler. The components disclosed or described herein can also be used to construct an artificial intelligence component. For example, identifying potential bindings or code optimizations can be carried out by a neural network, an expert system, a rules-based processing component, or a support vector machine (SVM), among others.

A classifier is a function that maps an input attribute vector, $X=(x1, x2, x3, x4 \ldots xn)$, to a confidence that the input belongs to a class, that is, $f(X)=\text{confidence(class)}$. Such a classification can employ a probabilistic and/or statistical-based analysis (for example, factoring into the analysis utilities and costs) to prognose or infer an action that a user desires to be automatically performed. In the case of an end-user programming module, patterns of events can be classified to determine whether to take one or more specified actions. Other patter-matching tasks can also be employed as will be evident to an artisan of ordinary skill upon reading this disclosure.

An SVM is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, and probabilistic classification models providing different patterns of independence can be employed. Classification as used herein also includes statistical regression that is utilized to develop models of priority.

As will be readily appreciated from the subject specification, components disclosed or described herein can employ classifiers that are explicitly trained (for example, by a generic training data) as well as implicitly trained (for example, by observing user behavior, receiving extrinsic information). For example, SVMs are configured by a learning or training phase within a classifier constructor and feature selection module. Thus, the classifier(s) can be used to automatically perform a number of functions including but not limited to making coding suggestions or identifying coding errors, as well as assisting during compilation of source code.

With reference to FIGS. 6-9, flowcharts in accordance with various methods or procedures are presented. While, for purposes of simplicity of explanation, the one or more methodologies shown herein, for example, in the form of a flow chart, are shown and described as a series of acts, it is to be understood and appreciated that neither the illustrated and described methods and procedures nor any components with which such methods or procedures can be used are necessarily limited by the order of acts, as some acts may occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology or procedure.

Figure 6:
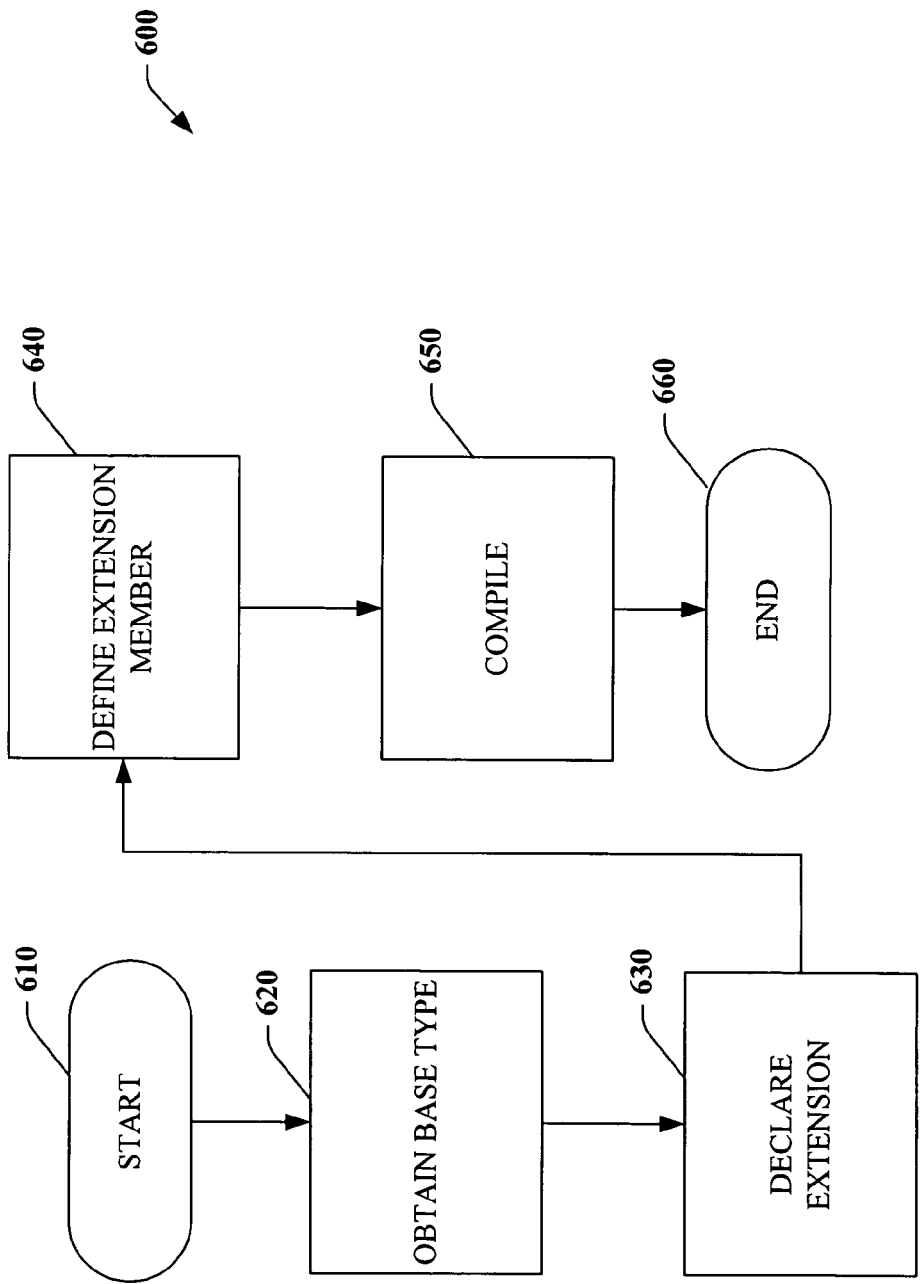
FIG. 6 is a flow diagram depicting a general processing flow of a method that can be employed in accordance with components that are disclosed and described herein.

FIG. 6 is a flow diagram of a method 600 that can be used in conjunction with various components that have been disclosed or described herein. The method 600 can be used to extend an arbitrary type to be used in an executable software program. Specifically, the method 600 allows for the addition of one or more members to an extension for a type to supplement preexisting functionality of a type being extended.

Processing of the method 600 begins at START block 610 and continues to process block 620. At process block 620, a base type is obtained. The base type can be a pre-existing part of a high level programming language or can be a type that is or was constructed by a computer programmer or software developer to address a particular coding need.

Processing of the method 600 continues to process block 630 where an extension type for the base type is declared. At process block 640, one or more members of the extension type are declared or defined by the computer programmer or software developer. Processing continues to process block 650 where an instance of the extension type is compiled and included in an executable application. Processing of the method 600 concludes at END block 660.

Figure 7:
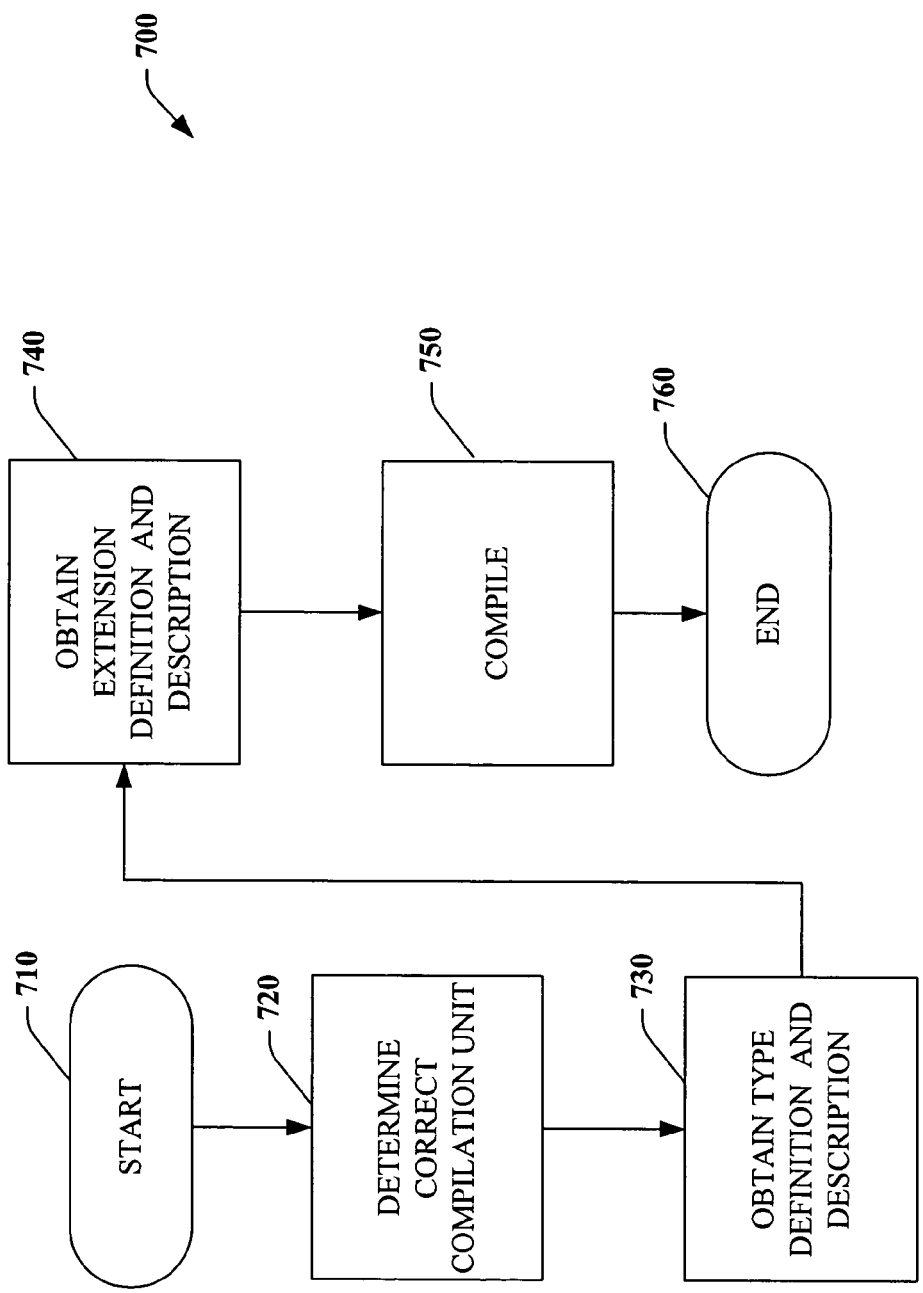
FIG. 7 is a flow diagram depicting a general processing flow of a method that can be employed in accordance with components that are disclosed and described herein.

FIG. 7 is a flow diagram of a method 700 that can be used in conjunction with various components that have been disclosed or described herein. The method 700 can be used to extend an arbitrary type to be used in an executable software program. Specifically, the method 700 allows for the extension of a pre-existing data type such that one or more members of an extension can be used across compilation units.

Processing of the method 700 begins at START block 710 and continues to process block 720. At process block 720, the correct compilation unit of a member is determined. At process block 730, a type definition and description of a base type is obtained. Processing continues to process block 740 where a type definition and description of an extension type that includes the member is obtained. The member is compiled into an executable computer program at process block 750. Processing of the method 700 terminates at END block 760.

Figure 8:
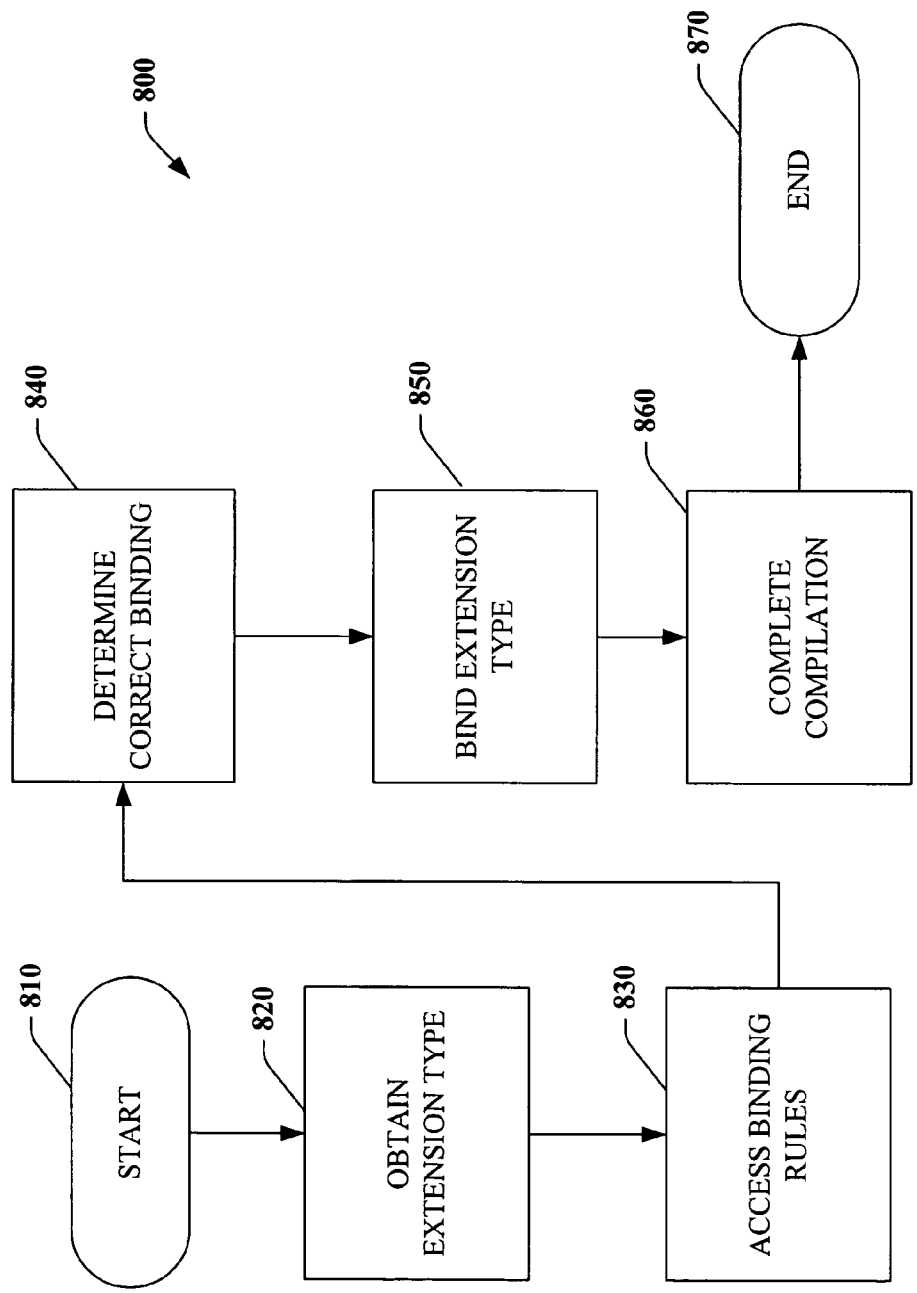
FIG. 8 is a flow diagram depicting a general processing flow of a method that can be employed in accordance with components that are disclosed and described herein.

FIG. 8 is a flow diagram of a method 800 that can be used in conjunction with various components that have been disclosed or described herein. The method 800 can be used to create bindings for type members during compilation of an executable software program. Specifically, the method 800 allows for the binding and disambiguation of members a data type that extends a pre-existing type.

Processing of the method 800 begins at START block 810 and continues to process block 820. At process block 820, information about an extension type, including its members, is obtained. Processing continues to process block 830 where binding rules for members and types are accessed. At process block 840, the correct binding is determined in accordance with the accessed binding rules. Bindings are created at process block 850. At process block 860, binding processes are completed and an executable application program is created. Processing of the method 800 concludes at END block 870.

Figure 9:
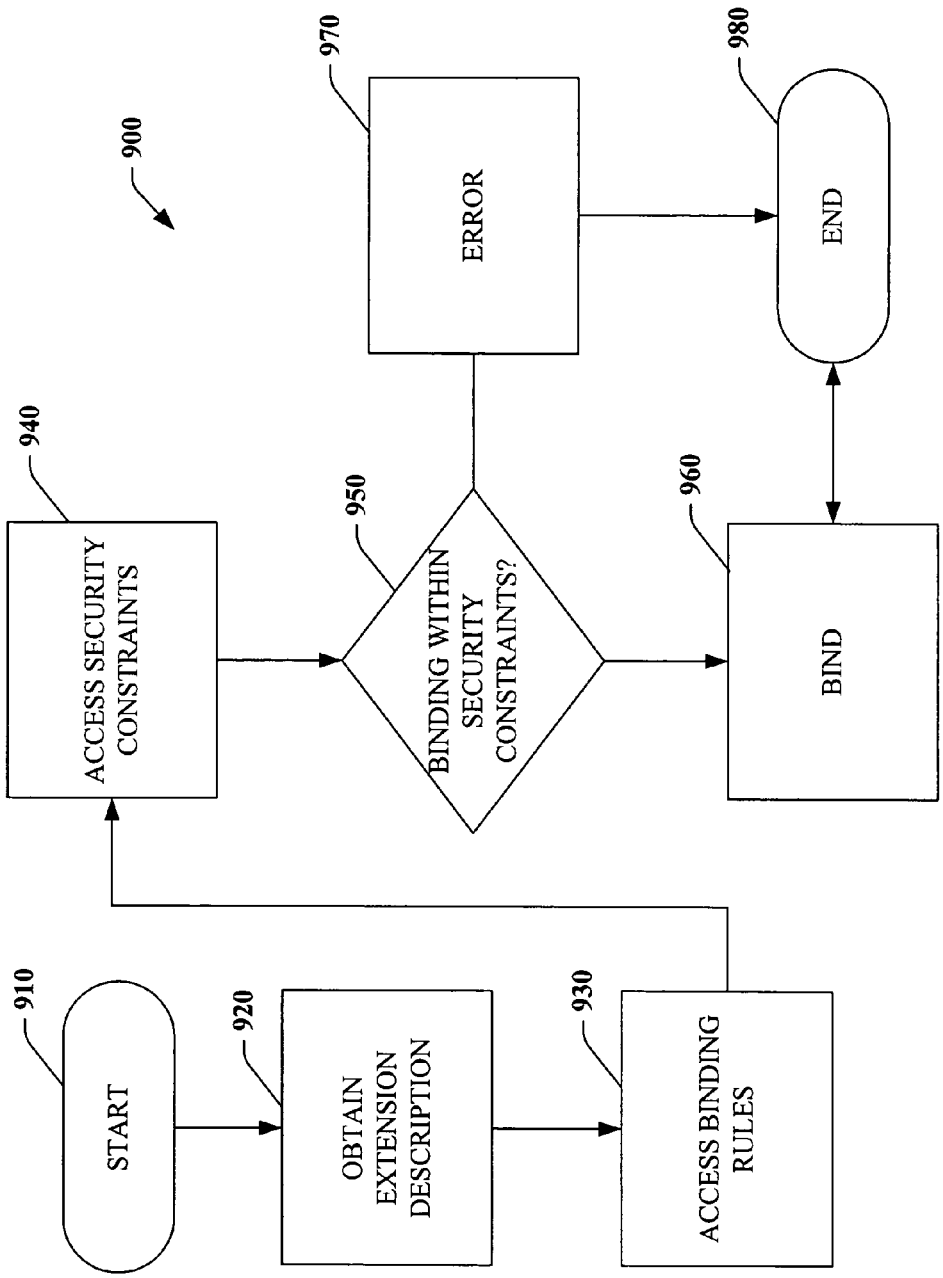
FIG. 9 is a flow diagram depicting a general processing flow of a method that can be employed in accordance with components that are disclosed and described herein.

FIG. 9 is a flow diagram of a method 900 that can be used in conjunction with various components that have been disclosed or described herein. The method 900 can be used to create bindings for type members and enforce security constraints during compilation of an executable software program. Specifically, the method 900 allows for the binding and disambiguation of members a data type that extends a pre-existing type in a way that satisfies any code security policies that are to be enforced.

Processing of the method 900 begins at START block 910 and continues to process block 920. At process block 920, a description is obtained of an extension type, including information about members of the extension type. Binding rules to be applied to the extension type are accessed at process block 930.

At process block 940, security constraints to be applied during compilation or execution of compiled code are accessed. Processing continues to decision block 950. At decision block 950, a determination is made whether a proposed binding is in accordance with the applicable security constraints. If yes, processing continues to process block 960 where the binding is applied. If the determination made at decision block 950 is no, processing continues to process block 970 where an error message is generated. Processing from either process block 960 or process block 970 concludes at END block 980.

Figure 10:
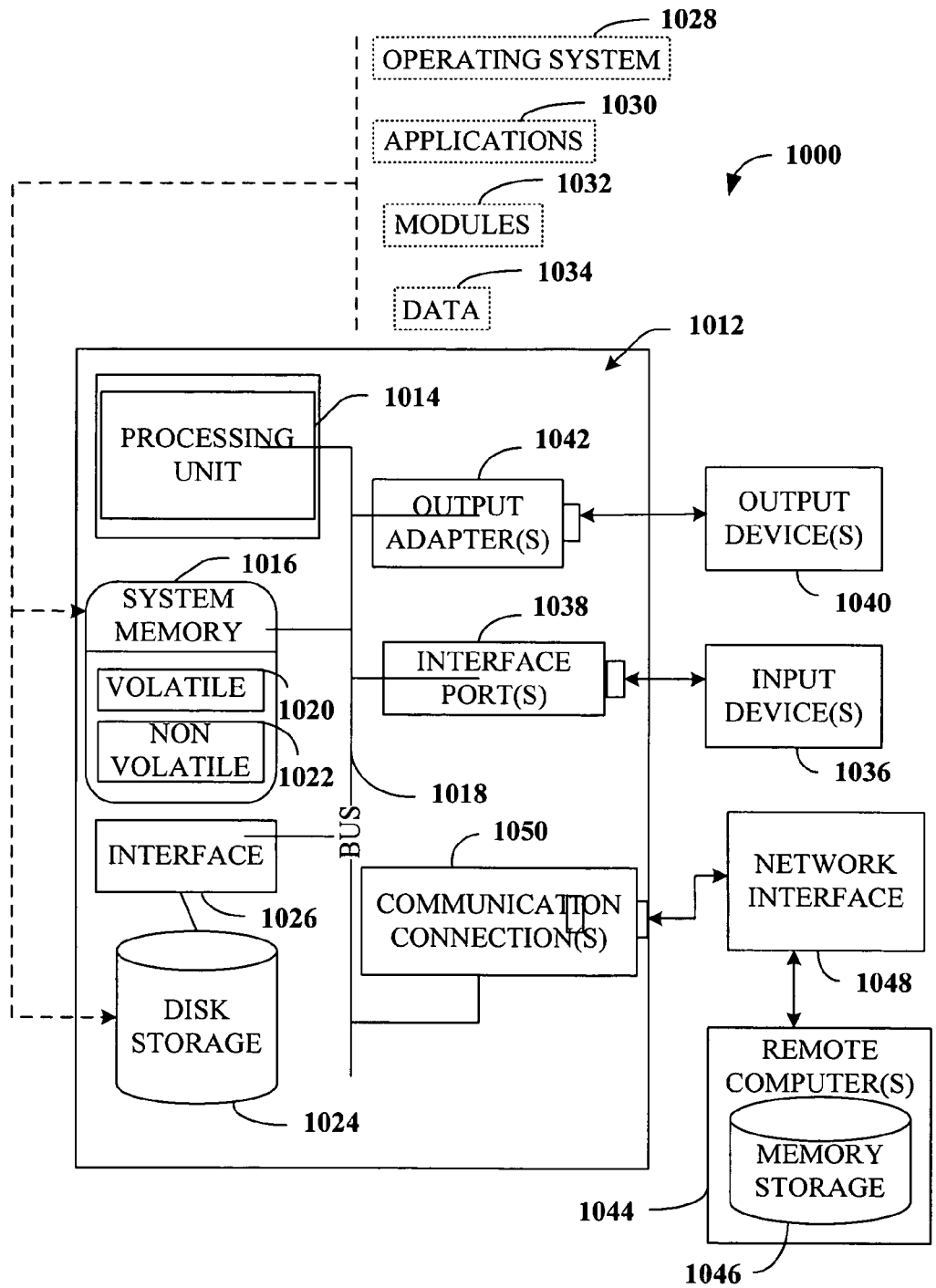
FIG. 10 illustrates an exemplary computing environment.

In order to provide additional context for implementation, FIGS. 10-11 and the following discussion is intended to provide a brief, general description of a suitable computing environment within which disclosed and described components and methods can be implemented. While various specific implementations have been described above in the general context of computer-executable instructions of a computer program that runs on a local computer and/or remote computer, those skilled in the art will recognize that other implementations are also possible either alone or in combination with other program modules. Generally, program modules include routines, programs, components, data structures, etc. that perform particular tasks and/or implement particular abstract data types.

Moreover, those skilled in the art will appreciate that the above-described components and methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. Certain illustrated aspects of the disclosed and described components and methods may also be practiced in distributed computing environments where certain tasks are performed by remote processing devices that are linked through a communications network or other data connection. However, some, if not all, of these aspects may be practiced on stand-alone computers. In a distributed computing environment, program modules may be located in local and/or remote memory storage devices.

With reference to FIG. 10, an exemplary environment 1000 for implementing various aspects of the invention includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multi-processor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/non-removable, volatile/non-volatile computer storage media. For example, FIG. 10 illustrates a disk storage 1024. The disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in the suitable operating environment 1000. Such software includes an operating system 1028. The operating system 1028, which can be stored on the disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the subject invention can be implemented with various operating systems or combinations of operating systems.

A user enters commands or information into the computer 1012 through input device(s) 1036. The input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

FIG. 11 is a schematic block diagram of a sample-computing environment 1100 within which the disclosed and described components and methods can be used. The system 1100 includes one or more client(s) 1110. The client(s) 1110 can be hardware and/or software (for example, threads, processes, computing devices). The system 1100 also includes one or more server(s) 1120. The server(s) 1120 can be hardware and/or software (for example, threads, processes, computing devices). The server(s) 1120 can house threads or processes to perform transformations by employing the disclosed and described components or methods, for example.

One possible means of communication between a client 1110 and a server 1120 can be in the form of a data packet adapted to be transmitted between two or more computer processes. The system 1100 includes a communication framework 1140 that can be employed to facilitate communications between the client(s) 1110 and the server(s) 1120. The client(s) 1110 are operably connected to one or more client data store(s) 1150 that can be employed to store information local to the client(s) 1110. Similarly, the server(s) 1120 are operably connected to one or more server data store(s) 1130 that can be employed to store information local to the server(s) 1140.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system for extending data types in software, comprising:
 a processor;
 system memory;
 an extension unit that extends an arbitrary preexisting base data type, wherein the base data type comprises at least one of a predefined high-level programming language data type and a constructed data type, the preexisting base data type having at least one member, wherein the base data type being extended supplies supplemental features and functions to those of the base data type, wherein the type extensions of the base data type are accessible in the high-level programming language using keywords according to a predefined syntax; and
 a supplemental member that is included with the extension unit and that provides additional functionality to the preexisting base data type, wherein the supplemental member is introduced using one or more portions of attached metadata, the metadata comprising custom attributes and annotations, and wherein the supplemental member is configured to implement new interfaces using a runtime environment that allows an interface to be registered at runtime using one or more dynamic virtual method tables, the runtime registration allowing partial types to implement new interfaces across one or more assemblies.

2. The system of claim 1, wherein the arbitrary preexisting base data type is at least one of a class, an interface, and a constructed type.

3. The system of claim 2, wherein the supplemental member is a shared member.

4. The system of claim 1, wherein the extended base data type comprises a generic type.

5. The system of claim 1, further comprising a limiting component configured to limit the supplemental member such that at least one attribute of the supplemental member consists of an attribute wherein the supplemental member cannot access members of the arbitrary preexisting base type that are inaccessible to an extending compilation unit, the supplemental member cannot override another member, the supplemental member cannot declare a shared constructor, the supplemental member cannot declare a nested type, an instance constructor of the supplemental member cannot call a non-public constructor, and the supplemental member cannot declare a static local member.

6. The system of claim 1, wherein the extended base data type is declared using a keyword extension.

7. The system of claim 1, wherein the extended base data type comprises an array.

8. The system of claim 2, wherein the supplemental member is limited such that the supplemental member cannot access members of the arbitrary preexisting base data type that are inaccessible to an extending compilation unit.

9. The system of claim 2, wherein the supplemental member is limited such that the supplemental member cannot override another member.

10. The system of claim 2, wherein the supplemental member is limited such that the supplemental member cannot declare a shared constructor.

11. The system of claim 2, wherein the supplemental member is limited such that the supplemental member cannot declare a nested type.

12. The system of claim 2, wherein the supplemental member is limited such that an instance constructor cannot call a non-public constructor.

13. The system of claim 2, wherein the supplemental member is limited such that the supplemental member cannot declare a static local member.

14. The system of claim 2, wherein the supplemental member can declare a static local member through use of at least one of a look-aside table and direct run-time support.

15. A computer-implemented method for extending capacities of software data types, comprising:
declaring an extension for an arbitrary preexisting data type, the preexisting base data type, wherein the base data type comprises at least one of a predefined high-level programming language data type and a constructed data type, the preexisting base data type having at least one member, wherein the base data type being extended supplies supplemental features and functions to those of the base data type, wherein the type extensions of the base data type are accessible in the high-level programming language using keywords according to a predefined syntax; and
creating a supplemental member for the extension that provides at least one additional capacity for the arbitrary preexisting data type, wherein the supplemental member is introduced using one or more portions of attached metadata, the metadata comprising custom attributes and annotations, and wherein the supplemental member is configured to implement new interfaces using a runtime environment that allows an interface to be registered at runtime using one or more dynamic virtual method tables, the runtime registration allowing partial types to implement new interfaces across one or more assemblies.

16. The method of claim 15, wherein declaring an extension for an arbitrary preexisting data type includes extending at least one of a class, an interface, and a constructed type.

17. The method of claim 16, further comprising limiting the supplemental member such that at least one attribute of the supplemental member consists of an attribute wherein the supplemental member cannot access members of the arbitrary preexisting base data type that are inaccessible to an extending compilation unit, the supplemental member cannot override another member, the supplemental member cannot declare a shared constructor, the supplemental member cannot declare a nested type, an instance constructor of the supplemental member cannot call a non-public constructor, and the supplemental member cannot declare a static local member.

18. The method of claim 16, wherein the supplemental member can declare a static local member through use of at least one of a look-aside table and direct run-time support.

19. The method of claim 16, wherein creating a supplemental member includes using a shared member.

20. A computer system comprising the following:
one or more processors;
system memory;
one or more computer-readable storage media having stored thereon computer-executable instructions that, when executed by the one or more processors, causes the computing system to perform a method for extending data types in software, the method comprising the following:
extending an arbitrary preexisting base data type, wherein the base data type comprises at least one of a predefined high-level programming language data type and a constructed data type, the preexisting base data type having at least one member, wherein the base data type being extended supplies supplemental features and functions to those of the base data type, wherein the type extensions of the base data type are accessible in the high-level programming language using keywords according to a predefined syntax; and
providing additional functionality to the preexisting base data type using a supplemental member, wherein the supplemental member is introduced using one or more portions of attached metadata, the metadata comprising custom attributes and annotations, and wherein the supplemental member is configured to implement new interfaces using a runtime environment that allows an interface to be registered at runtime using one or more dynamic virtual method tables, the runtime registration allowing partial types to implement new interfaces across one or more assemblies.

* * * * *